Dec. 10, 1968     C. D. HELM     3,415,799
POLYPROPYLENE PURIFICATION
Filed Aug. 15, 1963
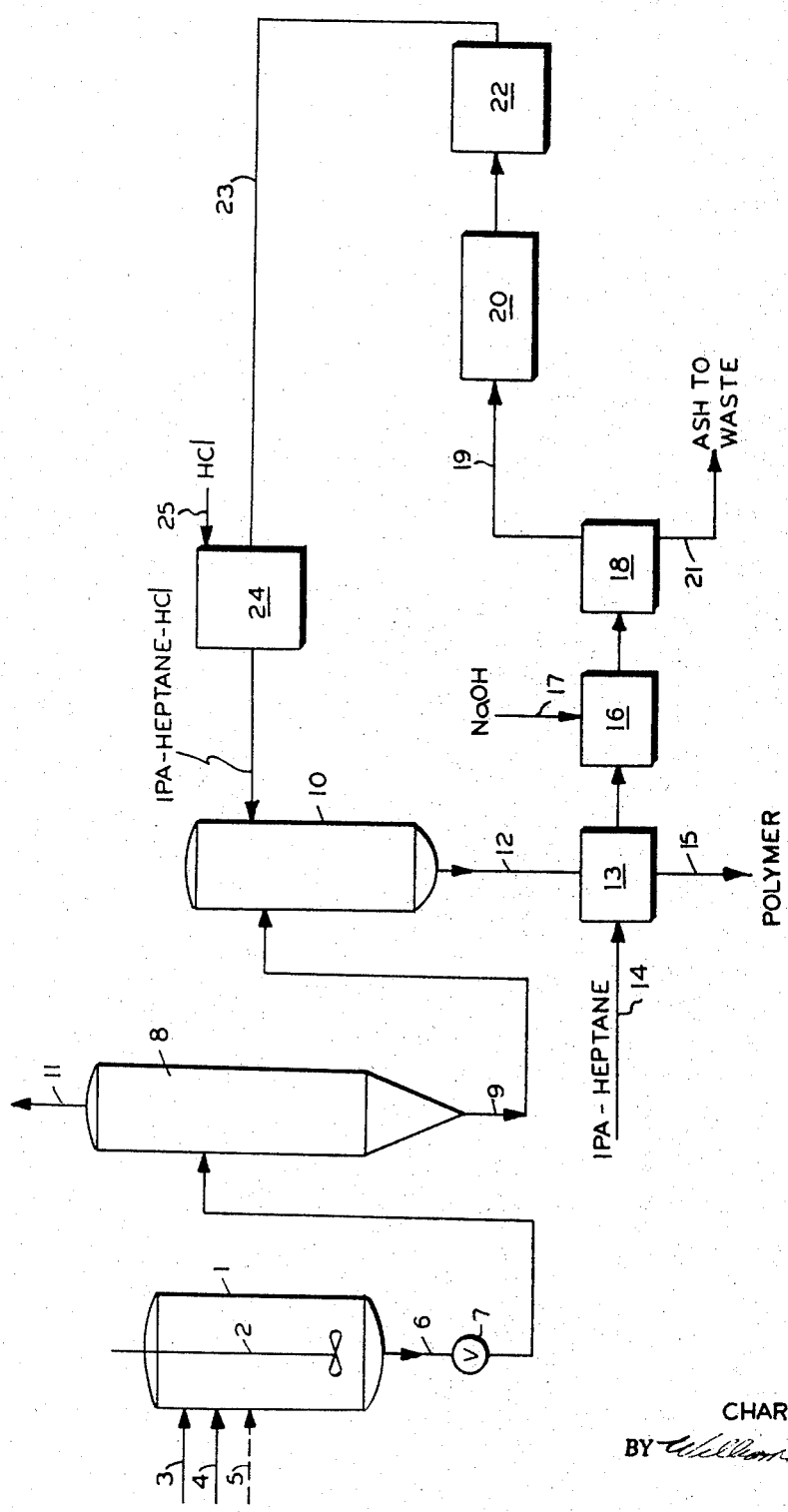
INVENTOR.
CHARLES D. HELM
BY *William E. Homer Jr.*
AGENT

United States Patent Office 3,415,799
Patented Dec. 10, 1968

3,415,799
POLYPROPYLENE PURIFICATION
Charles D. Helm, Annapolis, Md., assignor, by mesne assignments, to Rexall Drug and Chemical Company, Los Angeles, Calif., a corporation of Delaware
Filed Aug. 15, 1963, Ser. No. 302,401
4 Claims. (Cl. 260—93.7)

This invention is directed to the purification of polypropylene. In particular, this invention is related to a novel process for the purification of polypropylene utilizing an azeotropic mixture of isopropyl alcohol and n-heptane. This invention is further related to the system for recovering, purifying, and reusing the azeotropic isopropyl alcohol-heptane mixture.

In the process of this invention for purifying polypropylene wherein propylene has been polymerized in the presence of a polymerization catalyst and liquid propylene to produce a slurry of polypropylene in liquid propylene and the polypropylene has been separated from the liquid propylene by flashing in a cyclone separator to leave a substantially dry polypropylene product, the purification procedure comprises extracting the soluble atactic polypropylene and catalyst residues from the polypropylene product with an azeotropic mixture of isopropyl alcohol-heptane containing a small amount (approximately from 0.1 to 0.5 weight percent, based on the azeotropic isopropanol-heptane mixture) of HCl. The thus purified polypropylene is then separated from the azeotropic mixture by centrifuging, washed with anhydrous, acid free azeotropic isopropyl alcohol-heptane within the centrifuge, and again separated and recovered from the wash liquor. The wash liquor and filtrate is then passed through a neutralizer wherein a small amount of a caustic material, such as sodium hydroxide, is added to neutralize the HCl. The filtrate is then taken to a vaporization vessel, such as a distillation column, wherein the soluble atactic polypropylene and catalyst residues are separated from the azeotropic isopropanol-heptane wash liquor filtrate. The azeotropic mixture is then condensed, dried to remove the water produced by the neutralization reaction, and subsequently recycled to the extraction vessel. When polypropylene is purified by this process, it will be found to be 98% or higher isotactic, to contain less than 10 p.p.m. titanium, less than 30 p.p.m. aluminum, less than 50 p.p.m. chloride contents, and less than 50 p.p.m. HCl.

Processes for the polymerization of propylene are well known in the prior art. See Belgian Patent 538,792 and U.S. Patents 2,949,447 and 2,911,384. By the processes described in these patents, propylene is polymerized by contacting the monomer under relatively mild conditions of pressure and temperature with a catalyst composition composed of an organo metallic compound of a metal from Groups II and III of the Mendeleeff Period Table, such as aluminum, with a halide of a metal from Groups IVa, Va, or VIa, such as titanium trihalide, to produce high molecular weight crystalline polypropylene. This type of catalyst is well known in the art as a Ziegler or a Ziegler-Natta, catalyst. The polymerization may be carried out in an inert hydrocarbon solvent or using liquid propylene monomer as the diluent.

Generally, such processes produce polypropylene having a molecular weight of from about 50,000 to about 5,000,000 with a major portion of the polymer being crystalline in that it exhibits a crystalline structure by X-ray analysis and is insoluble in boiling n-heptane. Crystalline polypropylene is well known in the art for its highly desirable properties such as high tensile strength, high modulus of elasticity and good resistance to elevated temperatures.

The catalyst compositions which are normally used in the polymerization of propylene are comprised of titanium trichloride and an organo metallic component such as an aluminum alkyl as an activator. These catalysts are capable of producing polypropylene which is highly crystalline.

Such catalyst compositions do not generally exhibit high activities in the polymerization of propylene, however, for the solid polymer which is produced will form on the solid catalyst particles. The polymer which is formed on the catalyst particles will eventually completely coat the particles so that the polymerization reaction will decrease drastically after a relatively short period of time. To compensate for the low rate of polymerization which would normally result, the amount of catalysts must be substantially increased in order to produce a sufficient yield of polymer. When the proportion of catalyst is increased, however, the resultant polymer will be found to contain traces of the residual catalyst components. For commercial practice, it is essential that the finished polymer be substantially free of catalyst and other contaminates, since these contaminates will discolor and weaken the polymer. To accomplish this purification of the polymer, it is the general practice to subject the polymer to a purification process which involves the extraction of the polymer in an organic solvent solution such as an alcohol or an alcohol-hydrocarbon mixed solvent. The catalyst residues and other contaminates, such as soluble atactic polypropylene, will be extracted into the solvent, thereby leaving an insoluble substantially purified polypropylene.

According to the extraction procedures of the prior art, polypropylene was generally extracted in isopropanol, isopropanol containing a small amount of HCl, or an alcohol-hydrocarbon mixed solvent, such as methanol-hexane. It has been found that the methanol-hexane mixed solvent system is suitable because of the ability of the hydrocarbon to upgrade the polypropylene, i.e., to remove the atactic polypropylene therefrom. However, the methanol-hexane system offers many commercial disadvantages, some of which are listed in U.S. Patent 3,085,998. According to this patent, an inter-action will occur between the polymerization catalyst fragments and the methanol to produce a small amount of water. Since it is necessary to recover and to reuse the methanol and the hexane, the water must be removed from both. This is necessary because the water acts as a catalyst poison in the polymerization reactor (in conventional processes where a hydrocarbon diluent is used) and serves to fix the catalyst residues as insoluble oxides or hydroxides in the extraction column which makes polymer purification difficult if not impossible.

In order to remove the water from the methanol-hexane solvent system, complicated and expensive solvent distillation equipment is required. It is not possible to separate the water from the methanol-hexane system by the usage of a conventional desiccant dryer because of the absorption of the methanol along with the water on know desiccant absorbent materials. In contrast to this, isopropanol is not readily absorbed by desiccant materials. It is therefore possible to separate the water from the isopropanol-heptane mixture simply by passing such through a conventional desiccant dryer thereby greatly simplifying the polypropylene purification process and reducing the expense of such.

Another advantage of the isopropanol-heptane-HCl mixed solvent system is the more efficient up-grading of the polypropylene. The use of heptane makes it relatively simple to obtain polypropylene of at least 98% or higher isotacticity.

It is an object of this invention therefore to provide a novel process for the purification of polypropylene. It is an object of this invention to provide a process for purifying polypropylene whereby the above mentioned problems of the prior art are avoided. It is an additional object of this invention to provide the complete recovery system for the isopropyl alcohol-heptane-HCl mixed solvent system. Other objects, features, and advantages of this invention will be apparent to those skilled in the art in view of the following more detailed description.

These and other objects are obtained by means of this invention wherein polypropylene is purified by extracting the soluble atactic polypropylene and the catalyst residues from a polypropylene product with an azeotropic mixture of isopropanol-heptane containing approximately from 0.1 to 0.5 weight percent of HCl, based on the isopropanol-heptane mixture. This slurry of polypropylene in the isopropanol-heptane-HCl mixture is maintained near the reflux temperature for an average residence time of from one-half to 1 hour. At the end of this time, the thus purified polypropylene will be separated from the azeotropic mixture by centrifugation, washed with anhydrous, acid-free azeotropic isopropanol-heptane in the centrifuge, and again separated and recovered from the wash liquor. The wash liquor filtrate will then pass through a neutralization vessel wherein the HCl within the filtrate will be neutralized by reaction with a caustic material, such as sodium hydroxide. The soluble atactic polypropylene and catalyst residues will then be separated from the azeotropic mixture by vaporizing the azeotrope within a vaporization column. The azeotrope will then be condensed, dried, and recycled to the extraction vessel.

The terminology "azeotropic mixture" as used herein is intended to define a liquid mixture of two substances (isopropanol and heptane) which behaves like a single substance in that the vapor produced by partial evaporation of liquid has the same composition as the liquid. In this instance, the mixture is composed of 47.6 weight percent isopropanol and 52.4 weight percent heptane, since a commercial grade heptane, identified by the trade name, "AMSCO E-2," was used. This mixture will boil within the range of 165 to 172° F.

The amount of the isopropanol-heptane mixture to be used in the extraction column can vary over a considerable range. The preferred amount is within the range of 4 to 6 lbs. of the isopropanol heptane mixture per lb. of polypropylene. The amount of the HCl is not critical and can also be varied, but should be kept within the approximate range of from 0.1 to 0.5 weight percent of HCl based on the isopropanol-heptane mixture. The function of the HCl is to aid in dissolving any Ti or Al present as oxides or hydroxides. The function of the isopropanol is to react with the balance of the catalyst residue to form alkoxides, which are soluble in isopropanol. The heptane will serve to up-grade the polypropylene, i.e., to increase the isotacticity content of the polymer. The slurry of polypropylene in the azeotropic mixture will be maintained at near the reflux temperature for an average residence time of approximately one-half to 1 hour.

The invention will be better understood by reference to the accompanying drawing which illustrates the preferred embodiment.

Propylene was polymerized in a jacketed 150 gallon glass lined standard reaction vessel 1, equipped with a stirrer 2. The reactor is also equipped with incoming feedlines 3 and 4 for the catalyst composition and propylene monomer respectively. The reactor is also equipped with an additional feedline, indicated by the broken line 5, for the introduction of an inert hydrocarbon solvent to the reactor if the polymerization reaction is to be carried out in the presence of such solvent. In the working examples of this invention, propylene was polymerized using liquid propylene as the diluent, rather than a hydrocarbon solvent, but it is to be understood that either polymerization process can fall within the scope of the instant invention.

The reactor 1 is also equipped with a discharge line 6 and discharge valve 7 for taking the slurry of polypropylene in liquid propylene, or liquid hydrocarbon, to a recovery zone of the cyclone type 8. Discharge valve 7 is of the intermittent type and is designed to operate in such fashion as to be open approximately 1 second out of every 10 seconds.

Within the cyclone separator 8, the liquid propylene, or hydrocarbon diluent, will be flashed from the solid polypropylene and removed from the cyclone through overhead line 11. The propylene or hydrocarbon will be recovered and either stored or recycled for further usage within the polymerization vessel 1. A substantially dry polyproylene will thus be collected within the bottom of the cyclone and removed therefrom through discharge line 9 and taken to an extraction vessel 10. An azeotropic mixture of isopropanol and heptane, containing approximately from 0.1 to 0.5 weight percent HCl, based on the isopropanol-heptane mixture, will be admitted to the extraction vessel 10 through line 23. The slurry of polypropylene in isopropanol-heptane mixture will be maintained within the extraction vessel 10 at near the reflux temperature for an average residence time of approximately one-half to one hour. At the end of this time the slurry will be taken from the extraction vessel 10 through line 12 to the centrifuge 13, wherein the polymer will be separated from the isopropanol-heptane wash liquid. The polymer will also be washed within the centrifuge 13 with anhydrous, acid free isopropanol-heptane, which is admitted to the centrifuge through line 14. The polymer is separated from the wash liquid and removed from the centrifuge through line 15 through which it will be taken to further processing, such as drying.

The isopropanol-heptane filtrate and wash liquid will be removed from the centrifuge and taken to a neutralizer 16, wherein a small amount of a caustic material will be added through line 17. The caustic material which may be added can be any base material which is capable of reacting with the HCl within the wash liquid and neutralizing such. The preferred examples of such materials are sodium hydroxide, calcium hydroxide, etc. Only a small amount of this material need be added, i.e., enough to neutralize all HCl present so that the mixture is alkaline.

The neutralized filtrate is then sent to a vaporizer 18, such as a distillation column. The column bottoms, consisting of the soluble atactic polypropylene, catalyst residue, and a small amount of alcohol-hydrocarbon mixture, will be taken through line 21 and sent to waste. The column overhead (azeotropic isopropanol-heptane mixture) will be removed from the vaporizer through line 19 to condenser 20, wherein it will be condensed to a liquid. The azeotropic mixture is then passed through a desiccant dryer 22 to remove the water which has been formed by the neutralization reaction. The desiccant within the dryer can be any of the well known types such as silica-alumina gel, molecular sieves, or the like. The azeotropic solvent is passed through the drying columns at a superficial velocity in the range of 0.1 to 1 ft./min. which means an actual residence time of 5–50 minutes for the solvent within the dryer. The temperature of the dryer is in the range of 60–150° F., with 120° F. being the preferred temperature. The water free azeotropic mixture will then be recycled to the extraction vessel 10 through line 23 via storage vessel 24 wherein the desired amount of HCl will be added to the azeotropic mixture through line 25.

The following examples are used in the illustration of this invention, but are not to be considered as limiting the scope of this invention.

POLYMERIZATION PROCESS

Example I

The polymerization process used to produce polypropylene does not form a specific part of this invention. It is to be understood that the polypropylene used in the process of this invention may be formed by any known polymerization process. In the examples of this invention, however, propylene was polymerized in the diluent free process.

30 grams per hour of titanium trichloride co-crystallized with aluminum trichloride and 50 grams per hour of diethyl aluminum chloride were added through feedline 3 to the polymerization reactor 1, which was maintained under a nitrogen atmosphere with stirring. 150 lbs. per hour of propylene monomer was added to the reactor through feedline 4. The temperature within the reactor was 150 degrees F. The pressure within reactor was 410 p.s.i.g. As the polymerization proceeded, a suspension of approximately 50% of solid polypropylene in liquid propylene had been formed. This suspension was removed from the reactor through discharge line 6 and discharge-valve 7 to the cyclone separator 8, wherein the liquid propylene was flashed from the solid polypropylene leaving a substantially dry polypropylene within the bottom of the cyclone. The cyclone was operating at substantially atmospheric pressure and at a temperature of 150° F.

PURIFICATION PROCESS

Example II

Using the system described, the polypropylene was taken to the extraction vessel 10 wherein it was extracted in an azeotropic mixture of isopropanol-heptane (47.6% isopropanol, 52.4% heptane) containing 0.17% HCl, by weight, based on the isopropanol-heptane mixture. This slurry was held for one hour at a temperature 180° F. At the end of this time, the slurry was taken to a centrifuge, wherein it was washed with anhydrous, acid-free azeotropic isopropanol-heptane. The polypropylene was then separated from the isopropanol-heptane wash liquid within the centrifuge and taken from the centrifuge for further processing, such as drying.

The polypropylene thus obtained was then analyzed using standard analytical techniques to determine the impurity concentration. The polypropylene was found to contain 8 p.p.m. of titanium, 25 p.p.m. of aluminum, 30 p.p.m. of chloride and 20 p.p.m. HCl. The polymer was also extracted in boiling heptane and found to be 98.5% isotactic.

The azeotropic isopropanol-heptane wash liquid obtained from the centrifuge was then treated by the above described process. The filtrate was taken to the neutralizer wherein caustic was added until the mixture was alkaline. Thereafter, the filtrate was taken to the distillation column wherein the soluble atactic polypropylene and catalyst residues were separated from the azeotropic mixture. The azeotrope was then condensed, dried by passing at a superficial velocity of 0.1 ft./min. through a molecular sieve dryer operating at 120° F. to remove the water formed by the neutralization reaction, and recycled to the extraction column for further usage therein.

Example III

Polypropylene obtained from the cyclone separator was again extracted in an azeotropic mixture of isopropyl alcohol and heptane, containing approximately 0.1% HCl, by weight, based on the isopropyl alcohol-heptane mixture. This slurry was maintained at a temperature of 180° F. for a period of 1 hour. At the end of this time, the polypropylene slurry was taken to a centrifuge, wherein it was washed with anhydrous, acid-free azeotropic isopropyl alcohol-heptane. The polymer was then separated from the wash liquid within the centrifuge. The polymer thus produced was again subjected to standard analytical analysis to determine its impurity concentration. The polymer was found to contain 3 p.p.m. of titanium, 17 p.p.m. of aluminum, 10 p.p.m. of chloride, and 10 p.p.m. HCl. When extracted with boiling n-heptane, the polypropylene was found to be 98% isotactic.

The azeotropic mixture separated from the polymer within the centrifuge was again processed as described and recycled for further usage within the extraction column.

Example IV

The polypropylene was again polymerized within the reactor, as described, and separated from the liquid propylene within the cyclone separator. The polypropylene thus produced was taken to the extraction column, wherein it was extracted with the azeotropic mixture of isopropanol and heptane. This mixture contained approximately 0.1% HCl, by weight, based on the isopropanol-heptane mixture. This slurry was maintained at a temperature of 180° F. for a period of 1 hour. At the end of this time, the slurry was taken to the centrifuge. Within the centrifuge, the slurry was washed with anhydrous, acid-free azeotropic isopropanol-heptane. The polymer was then separated from the wash liquid within the centrifuge and removed therefrom.

The polypropylene was analyzed for its impurity concentration. The polymer was found to contain 3 p.p.m. of titanium, 7 p.p.m. of aluminum, 40 p.p.m. of chloride, and 40 p.p.m. of HCl. When extracted with boiling n-heptane, the polymer was found to be 98.8% isotactic.

The azeotropic wash liquid filtrate, obtained from the centrifuge, was again processed by the above described method and recycled for further usage within the extraction procedure.

The results of this invention demonstrate that when polypropylene is purified with an azeotropic mixture of isopropanol and heptane, containing a small amount of HCl, a substantially pure polypropylene product is produced. The azeotropic mixture of isopropanol and heptane can also very easily be purified, i.e., the soluble atactic polypropylene, catalyst residues, and water can be easily removed therefrom, without the necessity of complicated and expensive distillation equipment. Also, the isotactic content of the polypropylene which was obtained in the examples of this invention signifies the upgrading of the polymer which occurs when the azeotropic mixture of isopropanol-heptane-HCl is used in the purification process.

The polypropylene produced by the process of this invention can be fabricated into numerous useful articles, such as flat films, tubular films, fibers, sheets, or laminates. For example, the polypropylene can be blow-molded, injection molded, or extruded to form waste baskets, bottles, etc.

Many equivalent modifications will be apparent to those skilled in the art from the reading of the foregoing without a departure from the inventive concept. For example, it should be understood that although a single stage extraction is disclosed, it is intended to include multiple stage extractions within the scope of this invention. Similarly, this invention is applicable to both batch and continuous polymerization processes.

I claim:

1. In a process for producing polypropylene wherein propylene is polymerized in the presence of a catalytic amount of a titanium chloride activated with an aluminum alkyl polymerization catalyst to produce a suspension of polypropylene in liquid propylene, the polypropylene is separated from the liquid propylene by flashing in a cyclone separator to leave a substantially dry polypropylene product consisting essentially of crystalline and atactic portions, and the polypropylene product is subsequently purified, the improvement for obtaining a purified polypropylene product containing less than 10 parts per million of titanium, less than 30 parts per million of aluminum and less than 50 parts per million of chloride residues which consists essentially in:

(a) upgrading and purifying the polypropylene by extracting the soluble atactic polypropylene and catalyst residues from the polypropylene product with an azeotropic mixture of isoprpyl alcohol-heptane containing approximately from 0.1 to 0.5 weight percent HCl based on the isopropyl alcohol-heptane azeotrope by refluxing near the boiling point said polypropylene and azeotropic mixture, (b) separating the purified polypropylene from said azeotropic mixture, (c) washing said polypropylene with anhydrous, acid-free isopropyl alcohol-heptane, (d) separating and recovering the polypropylene from the wash liquor, (e) processing said azeotropic mixture to remove said soluble atactic polypropylene, catalyst residues and chloride residues, and (f) recycling the resulting processed azeotropic mixture to said extraction step.

2. In a process for polymerizing propylene, wherein propylene is polymerized in the presence of a catalytic amount of a titanium chloride activated with an aluminum alkyl polymerization catalyst to produce a suspension of polypropylene in liquid propylene, the polypropylene is separated from the liquid propylene by flashing in the cyclone separator to leave a substantially dry polypropylene product consisting essentially of chystalline and atactic fractions, and the polypropylene is subsequently purified, the improvement for obtaining a polypropylene product containing less than 10 parts per million of titanium, less than 30 parts per million of aluminum and less than 50 parts per million of chloride residues which consists essentially in:

(a) purifying the polypropylene by extracting the soluble atactic polypropylene and catalyst residues from the polypropylene product with an azeotropic mixture of isopropyl alcohol-heptane containing approximately from 0.1 to 0.5 weight percent HCl based on the ispropyl alcohol-heptane azeotrope mixture by refluxing near the boiling point said polypropylene and azeotropic mixture, (b) separating the purified polypropylene from the said azeotropic mixture by centrifuging, washing said polypropylene with anhydrous, acid free isopropyl alcohol-heptane in said centrifuge, again separating and recovering the polypropylene from the wash liquor, (c) neutralizing said HCl in the wash liquor filtrate by reaction with a caustic material, (d) separating said soluble atactic polypropylene and catalyst residues from the azeotropic isopropyl alcohol-heptane wash liquor filtrate by vaporizing the azeotropic isopropyl alcohol-heptane, and (e) condensing, drying, and recycling said azeotropic mixture to said extraction step.

3. The process of claim 2 wherein the amount of HCl in the azeotropic isopropyl alcohol-heptane mixture is 0.17 weight percent, based on the isopropyl alcohol-heptane mixture.

4. The process of claim 2 wherein the caustic material is sodium hydroxide.

References Cited
UNITED STATES PATENTS

| | | | |
|---|---|---|---|
| 3,001,976 | 9/1961 | Langer et al. | 260—94.9 |
| 3,022,267 | 2/1962 | Young | 260—94.9 |
| 3,082,199 | 3/1963 | Lattenkamp et al. | 260—94.9 |
| 3,216,986 | 11/1965 | Fritz et al. | 260—94.9 |
| 3,296,238 | 1/1967 | Van Der Plas. | |

JOSEPH L. SCHOFER, *Primary Examiner.*

L. EDELMAN, *Assistant Examiner.*

U.S. Cl. X.R.

260—94.9